United States Patent [19]

Batek et al.

[11] Patent Number: 5,031,732

[45] Date of Patent: Jul. 16, 1991

[54] SHOCK ABSORBER FOR A VEHICLE

[75] Inventors: Peter Batek, Erkrath; Hans Weiskopf, Hilden, both of Fed. Rep. of Germany

[73] Assignee: Fried. Krupp GmbH, Essen, Fed. Rep. of Germany

[21] Appl. No.: 316,856

[22] Filed: Feb. 28, 1989

[30] Foreign Application Priority Data

Mar. 2, 1988 [DE] Fed. Rep. of Germany ....... 3806709

[51] Int. Cl.$^5$ .............................. F16F 9/38
[52] U.S. Cl. .............. 188/322.120; 188/313; 188/322.19; 267/64.26
[58] Field of Search ............. 267/64.26, 64.28; 188/322.12, 322.19, 322.16, 313, 314

[56] References Cited

U.S. PATENT DOCUMENTS

| 2,522,323 | 9/1950 | Whisler, Jr. ............... 188/322.12 X |
| 2,664,859 | 1/1954 | Green ........................... 188/314 X |
| 2,812,954 | 11/1957 | Lyon ............................ 188/314 X |
| 3,128,089 | 4/1964 | Burris et al. . |
| 4,220,352 | 9/1980 | Umeda et al. . |
| 4,720,085 | 1/1988 | Shinbori et al. ................ 267/64.26 |

FOREIGN PATENT DOCUMENTS

| 209725 | 11/1959 | Austria . |
| 275503 | 7/1988 | European Pat. Off. ......... 267/64.26 |
| 1057465 | 5/1959 | Fed. Rep. of Germany . |
| 1065328 | 9/1959 | Fed. Rep. of Germany . |
| 2750737 | 5/1979 | Fed. Rep. of Germany ...... 188/314 |
| 3500601 | 7/1986 | Fed. Rep. of Germany . |
| 1110012 | 2/1956 | France ............................. 188/313 |
| 1172401 | 2/1959 | France . |
| 1185526 | 7/1959 | France . |
| 2551014 | 3/1985 | France . |
| 8806106 | 8/1988 | Int'l Pat. Institute . |
| 634040 | 11/1978 | U.S.S.R. ........................... 267/64.26 |

Primary Examiner—George A. Halvosa
Attorney, Agent, or Firm—Herbert Dubno; Andrew Wilford

[57] ABSTRACT

The shock absorber is mounted on a vehicle chassis. It comprises an outer guiding housing and a supporting member movable axially and rotatable relative to it. A hydraulic chamber is located between the guiding housing and the supporting member. This hydraulic chamber is formed by a hydraulic cylinder in this supporting member and is closed by a piston connected axially and nonrotatably with the guiding housing. The hydraulic cylinder may comprise the supporting member alone or may be a separate unit within the supporting member.

2 Claims, 2 Drawing Sheets

SHOCK ABSORBER FOR A VEHICLE

FIELD OF THE INVENTION

Our present invention relates to a hydraulic-pneumatic suspension strut (also called shock absorber and here after referred to as "shock absorber") for a vehicle, especially for a crane-carrying motor vehicle, i.e. a road-traveling crane.

BACKGROUND OF THE INVENTION

A shock absorber is known having an outer guiding housing mounted on a motor vehicle chassis, especially on the chassis of a crane-carrying motor vehicle, and a supporting member movable axially and rotatable relative to it. A hydraulic chamber is formed between the guiding housing and the supporting member.

Shock absorbers in or dumper mining cars are known in which an outer guiding housing comprises a hydraulic cylinder which is closed on top. A piston is slidably mounted in this hydraulic cylinder. Its comparatively thick piston rod is mechanically guided in lower hydraulically "open" parts (i.e. parts not acted on hydraulically). A flange is provided on the free end of the piston rod which acts as an axially slidable supporting member to which the wheel suspension is attached.

With large transverse forces, as can occur in braking or in travelling over an obstacle, the piston rod experiences a bending moment which tends to bring the piston out of axial alignment. That tends to tilt the piston which makes its sliding in the cylinder difficult and leads to increased fluid leakage losses.

OBJECTS OF THE INVENTION

It is an object of our invention to provide an improved shocked absorber for a motor vehicle.

It is also an object of our invention to provide an improved shock absorber for a motor vehicle in which the above-mentioned disadvantages including increased leakage losses and an impeded slidability are avoided with simple means.

SUMMARY OF THE INVENTION

According to our invention the hydraulic chamber is formed by a hydraulic cylinder located in the supporting member and is closed by a piston connected axially and nonrotatably with the guiding housing.

Since the hydraulic pressure is exclusively applied to the interior of the supporting member, no problems arise due to leakage losses in the guiding housing.

Since the piston must be smaller than the outer diameter of the guides a comparatively small piston area by comparison with the effective area of the piston used heretofore results so that, even if allowances are made for a higher pressure, a reduced amount of hydraulic fluid is forced between the supporting member and the guiding housing for equal relative displacements.

Many forms of our invention are possible. In a particularly simple and effective embodiment of our invention the hydraulic cylinder is comprised by the supporting member itself. It is also particularly advantageous if the hydraulic cylinder can be easily removed for repair and can be replaced by a new one. This can be accomplished if the hydraulic cylinder is a separate unit mounted securely in the supporting member.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
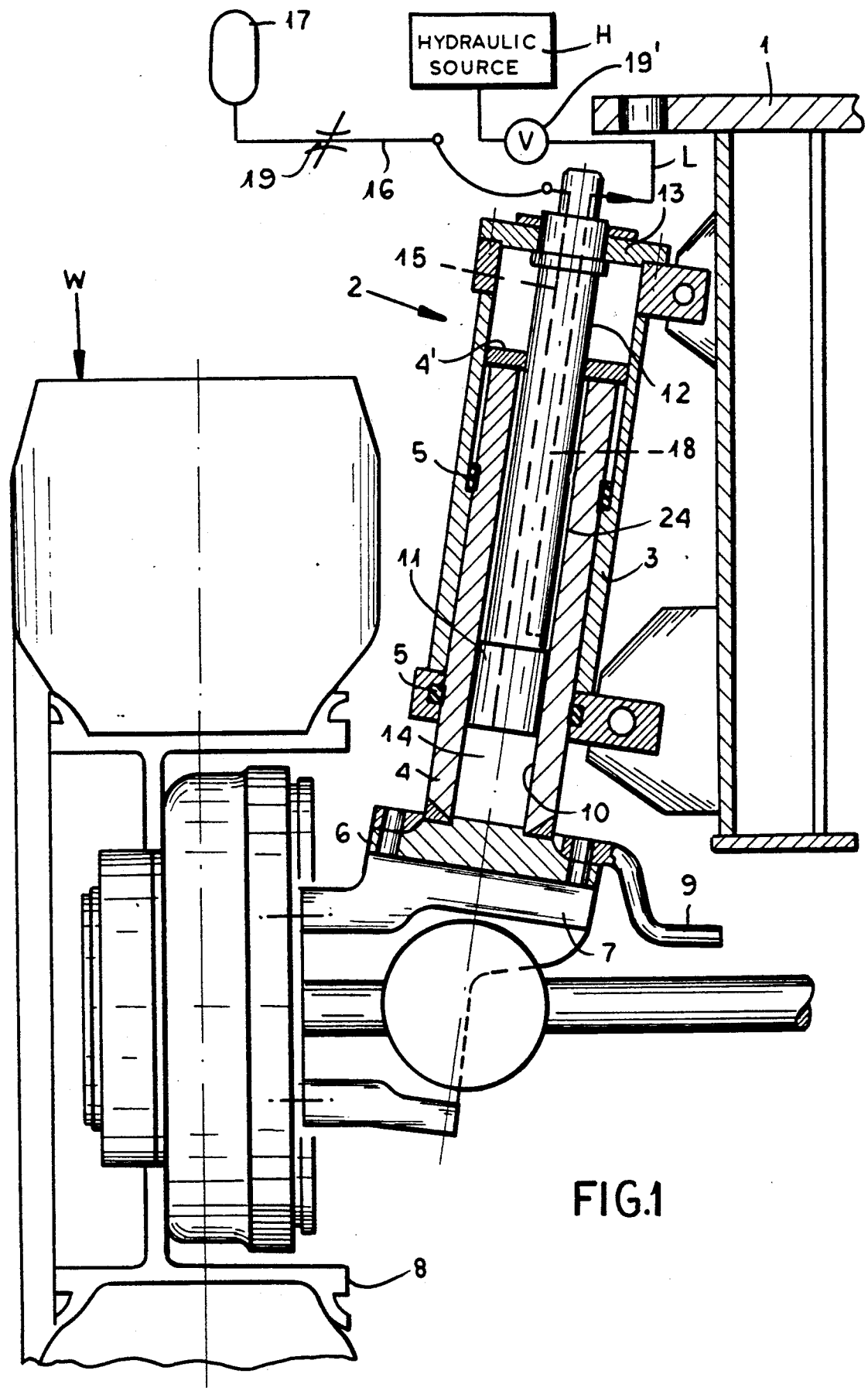
FIG. 1 is a longitudinal cross sectional view of a shock absorber according to our invention attached to a crane-carrying vehicle chassis.

A shock absorber 2 according to our invention is mounted on the motor vehicle chassis 1 for a wheel W of the vehicle in FIG. 1.

The shock absorber comprises a hollow cylindrical guiding housing 3 mounted on the motor vehicle chassis 1, in which a cylindrical supporting member 4 is guided rotatably and slidably. A guide ring 5 made of bronze or plastic is provided on the guiding housing 3 for transmission of transverse forces produced by brakes for example.

The supporting member 4 is provided on its outer end with a flange 6 to which a so-called axle journal jacket (ball joint) or a wheel support 7 for mounting the rim of the wheel W is attached.

A steering arm 9 is attached to the flange 6 and is connected with a connecting rod not illustrated in detail. The supporting member 4 is formed as a follow cylinder 10 inside which a piston 11 is mounted. The piston rod 12 of the piston 11 extends away from the flange 6 and is connected rigidly with the cover and/or base 13 at the closed end of the guiding housing 3. Thus the piston 11 is axially fixed and nonrotatable relative to the guiding housing 3.

A hydraulic chamber or cylinder chamber 14 located between the flange 6 and the piston 11 provides a closed pressure chamber of the hydraulic cylinder 10 and/or the shock absorber 2 and is connected by a passage 15 extending through the piston 11 and the piston rod 12 with a hydraulic or pressurized fluid reservoir or accumulator 17. The piston rod 12 is traversed by an additional passage 18, which communicates at one end with the cylinder chamber 24 above the piston 11 and may communicate at the other end either with a supply line or duct (L via a valve 19' to a respective hydraulic pressure source H) or with the accumulator 17 via duct 16, alternatively, or, for fixing the position of the supporting element 4 relative to the guiding housing 3 or the piston 11, may communicate with the lower cylinder chamber 14 immediately with the accumulator 17 being shut off in that case.

The hydraulic pressure in the hydraulic chamber 14 is substantially at the same pressure as in the pressurized fluid reservoir 17. During an increase in the load and/or during an upward thrust exerted from below during travel on the wheel W the guiding housing 3 is pushing further on the supporting member 4 and/or the supporting member 4 is inserted deeper in the housing 3, so that the pressurized hydraulic chamber 14 is reduced in size.

Hence, the hydraulic medium is partially forced from the pressurized hydraulic chamber 14 through the passage 15 in the direction of the pressurized reservoir 17 in which the hydraulic pressure climbs relative to the set pressure so that the relative motion between the supporting member 4 and the guiding housing 3 is limited according to the hydraulic equilibrium.

To avoid a discontinuous or shocklike relative motion an adjustable throttle 19 is built into the duct 16 leading to the fluid reservoir 17.

On lifting the wheel 8 with the undercarriage or chassis 1 braced on the ground by the usual crane bracing legs (not shown) the cylinder chamber 24 located above the piston 11 is pressurized and the cylinder chamber 14 is depressurized.

Figure 2:
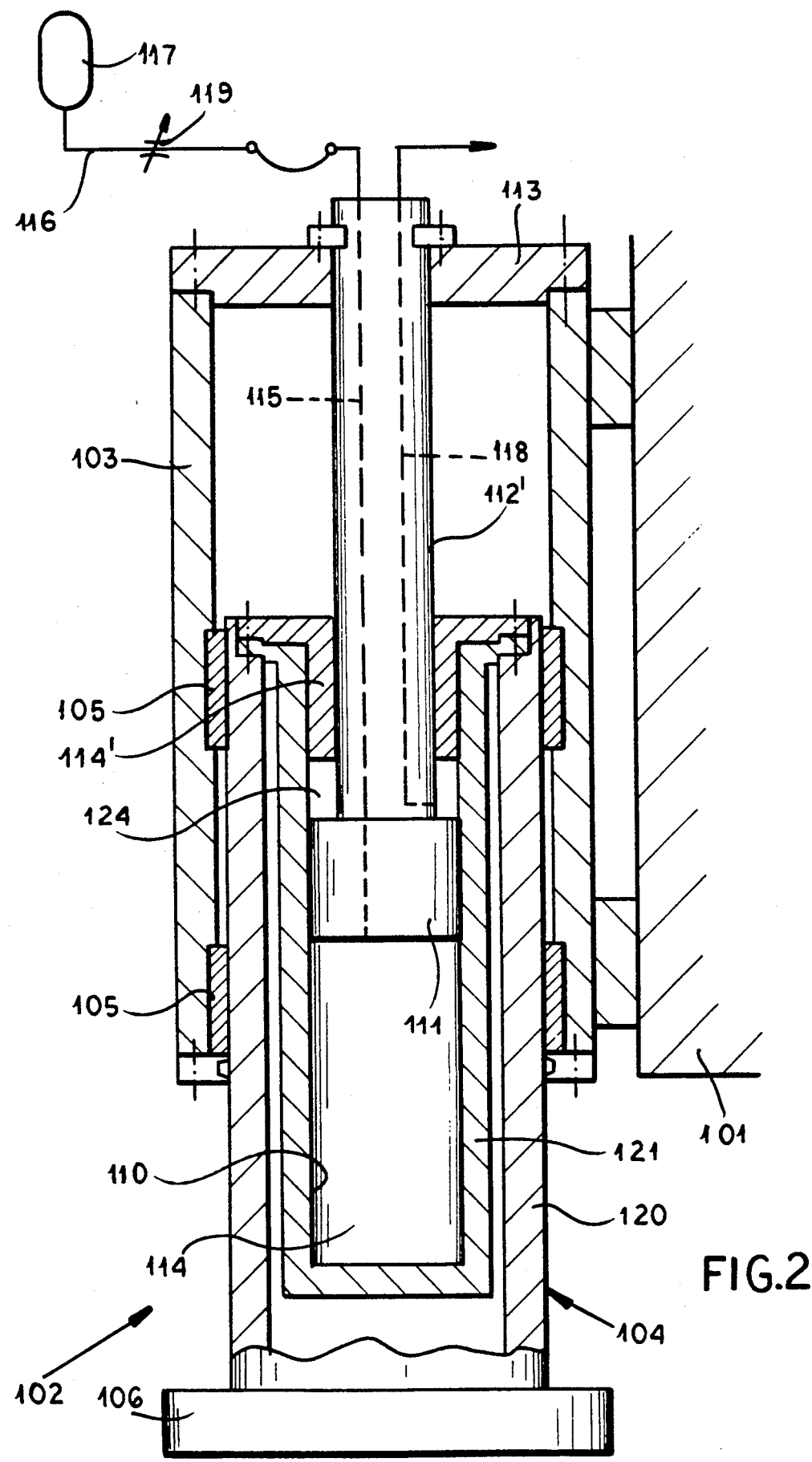
FIG. 2 is a longitudinal cross sectional view of another embodiment of a shock abosorber according to our invention.

In the embodiment of the stock absorber 102 shown in FIG. 2 the guiding housing 103 is constructed in substantially the same manner as in the previous embodiment. The supporting member 104 is formed however in two parts and has an outer guide pipe 120 and a hydraulic cylinder 121 mounted in it.

The guide 120 and the hydraulic cylinder 121 are attached detachably with each other at one end only such that the portion of the cylinder 121 below the one end has freedom of at least limited lateral play. The piston 111 is mounted inside the hydraulic cylinder 121 in the embodiment according to FIG. 2. The individual parts of the shock absorber 102 in FIG. 2 have parts which a reference number which is higher by 100 than the correspondingly functioning reference number for the corresponding part in the embodiment of FIG. 1, e.g. the guide 105 in FIG. 2 correspond functionally to guide 5. The cylinder chambers 24, 124 are closed by sealing plates or ends 4' and 114' which hug the piston rod 12 and 112', respectively.

Parts not necessary for an understanding of our invention, e.g. a pressurized medium source for replenishing hydraulic leakage losses, are not shown in these FIGURES.

We claim:

1. A shock absorber for a crane-carrying vehicle, the shock absorber comprising:
   an outer guiding housing mounted on said crane-carrying vehicle,
   a supporting member mounted in said guiding housing, movable axially, and rotatable relative to said guiding housing,
   a wheel support fastened to said supporting member,
   a piston having a piston rod and connected axially and nonrotatably with said guiding housing via the piston rod,
   a separate hydraulic cylinder located in said supporting member, having a closed lower end, having an upper end secured to the supporting member, slidably receiving said piston, and forming with the piston a chamber, said supporting member and said hydraulic cylinder being attached detachably with each other at the upper cylinder end but the cylinder being received in the supporting member with freedom of at least limited lateral play below the upper cylinder end,
   a hydraulic accumulator, and
   means including a passage extending through said piston and said piston rod, provided with a throttle, and connecting the chamber with the accumulator.

2. In combination with a traveling crane chassis, a shock absorber mounted in a generally upright position on said chassis and comprising:
   a guide tube fixed on said chassis and having an upper end,
   a tubular support slidably and rotatably received in said guide tube, having an upper end and a lower end, and guided without lateral play therein,
   a flange at the lower end of said support,
   a hydraulic cylinder having a closed lower end, forming a separate unit, having an upper end attached detachably with the upper end of the tubular support, and located within said tubular support with freedom below the upper end thereof for at least limited lateral play,
   a piston received by and slidable in said hydraulic cylinder and defining together with said hydraulic cylinder a lower first chamber located between the piston and the closed lower end of said hydraulic cylinder,
   a piston rod on the piston extending out of the upper end of said support and having an upper end,
   a seal closing said upper end of said hydraulic cylinder around the piston rod, hugging said rod, and defining an upper second chamber in said hydraulic cylinder with said piston,
   means fixing said piston to said guide tube against relative axial and rotational movement at the upper end of said rod and the upper end of said tube, said support being rotatable and axially shiftable relative to said tube and said piston;
   means for affixing said flange to a steerable wheel knuckle;
   a pressure accumulator,
   a source of hydraulic pressure,
   means including respective first and second passages extending through said rod for connecting said first chamber to the pressure accumulator and said second chamber to the source of hydraulic pressure, and
   a throttle valve in the first passage.

* * * * *